United States Patent [19]

Kaish et al.

[11] Patent Number: 5,633,924
[45] Date of Patent: May 27, 1997

[54] TELECOMMUNICATION NETWORK WITH INTEGRATED NETWORK-WIDE AUTOMATIC CALL DISTRIBUTION

[75] Inventors: Steven T. Kaish, Bridgewater, N.J.; Eugene P. Mathews, Barrington, Ill.; Nigel G. Matson, Glen Gardner, N.J.; Carlos A. Perea, Bethlehem, Pa.; George J. Ryva, Colts Neck, N.J.; James B. Shepard, Pickerington, Ohio; Smita P. Sheth, Edison, N.J.; Robert J. Thornberry, Jr., Wheaton, Ill.

[73] Assignee: Lucent Technologies Inc., Murray Hill, N.J.

[21] Appl. No.: 570,138

[22] Filed: Dec. 11, 1995

Related U.S. Application Data

[63] Continuation of Ser. No. 129,283, Sep. 30, 1993, abandoned.

[51] Int. Cl.$^6$ .................................................. H04Q 3/64
[52] U.S. Cl. ......................... 379/266; 379/207; 379/220; 379/230; 379/265; 379/309
[58] Field of Search ........................ 379/265, 266, 379/309, 212, 221, 157, 207, 230, 220

[56] References Cited

U.S. PATENT DOCUMENTS

| | | | |
|---|---|---|---|
| 4,400,587 | 8/1983 | Taylor et al. | 379/266 |
| 4,737,983 | 4/1988 | Frauenthal et al. | 379/221 |
| 4,763,353 | 8/1988 | Canale et al. | 379/157 |
| 4,881,261 | 11/1989 | Oliphant et al. | 379/266 |
| 4,951,310 | 8/1990 | Honda et al. | 379/266 |
| 4,953,204 | 8/1990 | Cuschleg, Jr. et al. | 379/266 |
| 5,020,095 | 5/1991 | Morganstein et al. | 379/134 |
| 5,036,535 | 7/1991 | Gechter et al. | 379/265 |
| 5,062,103 | 10/1991 | Davidson et al. | 379/265 |
| 5,073,890 | 12/1991 | Danielsen | 379/265 |
| 5,168,515 | 12/1992 | Gechter et al. | 379/265 |
| 5,247,569 | 9/1993 | Cave | 379/309 |
| 5,249,223 | 9/1993 | Vancore | 379/207 |
| 5,291,550 | 3/1994 | Levy et al. | 379/265 |
| 5,291,552 | 3/1994 | Kerrigan et al. | 379/266 |
| 5,299,257 | 3/1994 | Otto | 379/221 |
| 5,299,260 | 3/1994 | Shaio | 379/266 |
| 5,329,583 | 7/1994 | Jurgensen et al. | 379/266 |
| 5,335,269 | 8/1994 | Steinlicht | 379/266 |
| 5,392,345 | 2/1995 | Otto | 379/265 |

FOREIGN PATENT DOCUMENTS

| | | | |
|---|---|---|---|
| 0376527A2 | 7/1990 | European Pat. Off. | H04M 3/50 |
| 0429770A2 | 6/1991 | European Pat. Off. | H04M 3/50 |
| 0501513A2 | 9/1992 | European Pat. Off. | H04M 3/42 |
| WO92/09164 | 5/1992 | WIPO | H04M 3/00 |

OTHER PUBLICATIONS

8081 Proceedings of the National Communications Forum 43(1989) Oct. 2/4 No. 1 Chicago, Illinois, US pp. 548–551.
"Sprint Opens Its Network to Developers and Large Users", Call Center Magazine, May 1993 pp. 13–20.
"Getting Into AT&T's Network", Call Center Magazine, Jun. 1993, p. 10.
"Advantis Forges Link to Sprint's SS7 Net", Call Center Magazine, Jun. 1993, pp. 23–24.

*Primary Examiner*—Krista M. Zele
*Assistant Examiner*—Scott Wolinsky
*Attorney, Agent, or Firm*—Charles L. Warren

[57] ABSTRACT

A plurality of telecommunication switches are coupled to agent communication terminals (ACTs) which are used by agents for handling incoming calls. An integrated control system is coupled to the ACTs and controls the distribution of incoming calls among the ACTs. An intelligent node in the system can access an agent queue that stores data indicating availability of ACTs to handle the call and a call queue which stores data concerning calls waiting for ACD service. A database stores processing instructions for the handling of incoming calls based on data contained in the agent and call queues, and subscriber specified instructions.

41 Claims, 2 Drawing Sheets

TELECOMMUNICATION NETWORK WITH INTEGRATED NETWORK-WIDE AUTOMATIC CALL DISTRIBUTION

This application is a continuation of application Ser. No. 08/129,283, filed on Sep. 30, 1993, now abandoned.

BACKGROUND OF THE INVENTION

This invention is generally directed to the automatic distribution of incoming telephone calls and more specifically, addresses a telecommunication network which integrates the control of such calls as part of the general call routing function.

Various types of conventional automatic distributors (ACDs) are available to distribute incoming calls to a subsist. Reservation and information services may be provided by large companies, such as major airlines, and may consist of geographically separated groups of agents which answer incoming calls distributed to the agents by separate ACDs. Agent communication terminals (ACTs) which are connected to an ACD are utilized by the agents to process incoming calls routed to a particular ACT by the ACD.

A public branch exchange (PBX) type ACD such as a Definity® ACD available from AT&T functions as a conventional PBX and further functions as an ACD to distribute incoming calls to local agents connected to the PBX. Another type of ACD consists of the utilization of an electronic telecommunication switch such as a 5ESS® switch available from AT&T which is capable of providing ACD service when supposed by ACTs coupled to the switch. Both types of ACD typically function as independent systems which handle incoming calls and make internal decisions concerning which agent will receive a given call. Both types of ACD systems are capable of generating statistical reports which can be monitored by a work station coupled to the ACD system to allow a supervisor to monitor call handling statistics. Such data typically represents an average of statistics for a given system.

U.S. Pat. No. 4,737,983 to Frauenthal et al. addresses a method of balancing traffic loads to a plurality of customer ACDs. Each ACD periodically transmits call congestion data representing an accumulation of data for the ACD to a central database. Based on this data, the database determines a preferred ACD to which to route an incoming call. Although this technique may be generally sufficient for balancing certain traffic loads, it relies on accumulated or aggregate data on which to base decisions and, hence does not permit specific agents, i.e. ACTs, to be identified to receive a call.

In U.S. Pat. No. 4,953,204 to Cuschleg, Jr. et al. a method is described for queuing calls to a multi-location service provider having a plurality of ACDs. Decisions on routing a call to the ACD is based on the availability of a non-busy voice channel to the ACD. If all channels (circuits) are busy, a call is queued until an ACD becomes available to take the call as determined by a non-busy circuit to the respective ACD. However, the number of agents associated with a given ACD does not necessarily equal the number of circuits provided to the ACD. Thus, the monitoring of available circuits as the basis for queue management and the routing of calls does not correspond to actual agent availability.

SUMMARY OF THE INVENTION

It is an object of the present invention to provide an integrated network-wide ACD network and corresponding method for managing the distribution of calls to ACTs based on current availability of individual agents.

In an embodiment of the present invention, a network supports the distribution of incoming calls to a plurality of ACTs coupled to the network. The network includes a plurality of telecommunication switches which connect incoming calls requiting ACD service to an ACT. A control system which is an integrated part of the network controls the distribution of incoming calls among the ACTs. An agent queue stores data, preferably real-time updated data, indicative of the availability of each ACT to accept an incoming call. A call queue stores call-waiting data for each incoming call that is held due to the unavailability of an appropriate ACT to accept the call. A control node which is coupled to the agent queue and call queue determines the availability of an ACT to accept a call being held based on data stored in the agent queue. The node then selects a call to be routed to an available ACT based on the call-waiting data in the call queue and subscriber handling instructions. The node then sends routing instructions to the switch associated with the ACT selected to handle the call. Thus, call-waiting time is minimized by efficiently matching individual ACTs with calls awaiting ACD service. Waiting calls can be handled on a first in, first out basis or other subscriber desired methods, and ACTs can be assigned calls based on the ACT which has been available for the longest time period.

BRIEF DESCRIPTION OF THE DRAWING'S

DETAILED DESCRIPTION

Figure 1:
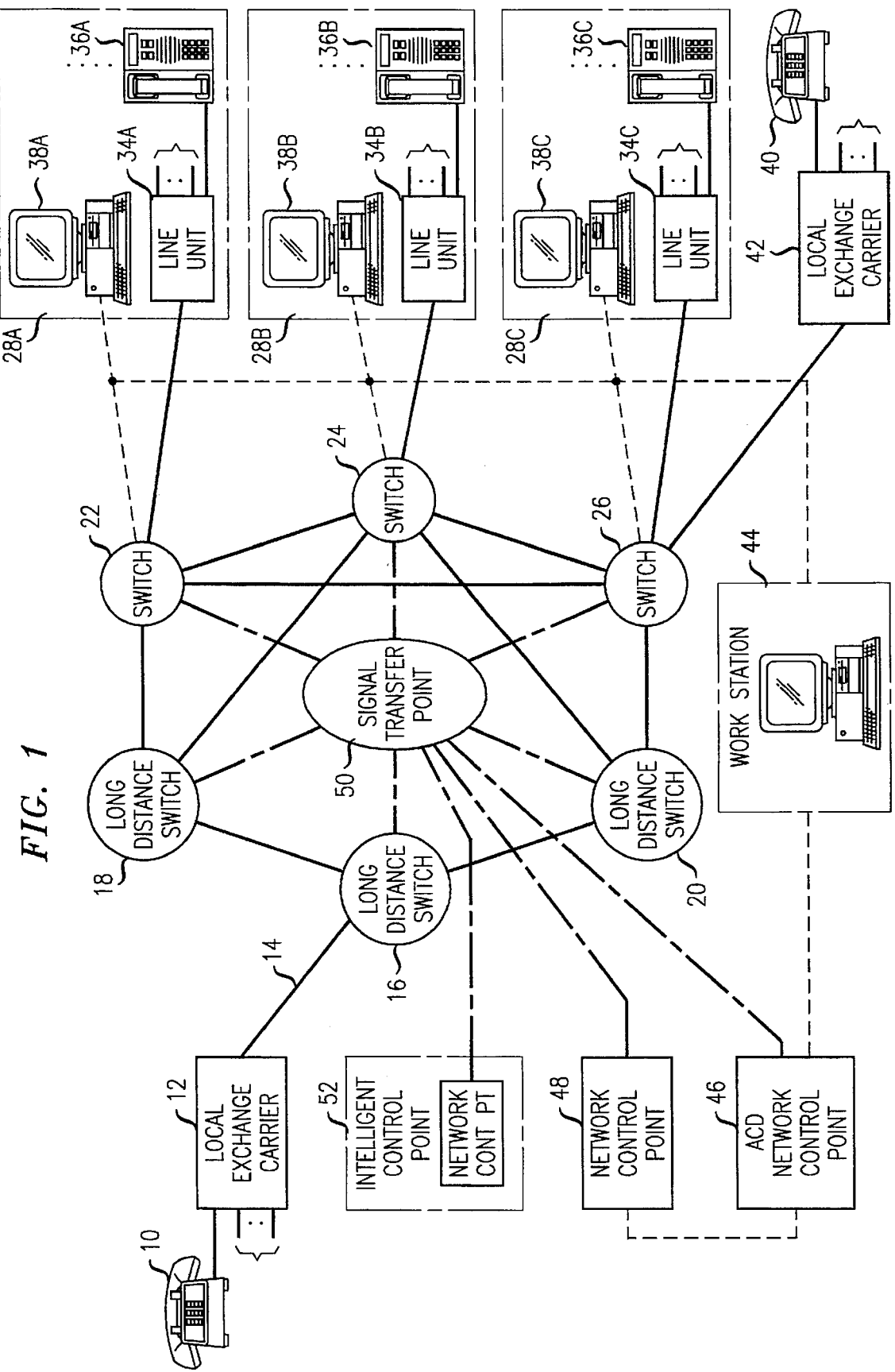
FIG. 1 is a block diagram of a telecommunication system which incorporates an embodiment of the present invention.

FIG. 1 illustrates a telecommunication network which incorporates the integrated ACD service in accordance with an embodiment of the present invention. A conventional customer premises equipment 10 such as a telephone set is supported by a local exchange carder 12 which provides conventional central office facilities to its customers. The local exchange carrier 12 is connected by communication channels 14 to long distance switch 16 which forms part of the long distance telecommunication network. The long distance switch 16 may comprise an AT&T 4ESS™ switch. In the illustrated example, long distance switch 16 is connected to additional long distance switches 18 and 20 which may serve as relay nodes in the long distance network and support additional incoming traffic from other local exchange carriers (not shown).

The long distance switches are connected directly or indirectly through other long distance switches to illustrative switches 22, 24, and 26 which support ACD groups 28A, 28B, and 28C, respectively. Each of switches 22, 24, and 26 provide capability of switching incoming calls to the respective ACD group and in the illustrative embodiment provide integrated ACD functionality. For example, these switches may comprise an AT&T 5ESS® switch equipped with an ACD/MIS option known as the Pinnacle ACD system.

Each of the illustrative ACD groups 28A, 28B and 28C are shown as comprising similar elements which are labeled with the same reference numbers and differentiated by a corresponding suffix letter. Each ACD group is capable of supporting a plurality of concurrent incoming calls which are forwarded to the ACD group from the supporting switch and received by an interface line unit 34 which couples the respective lines/calls to corresponding agent communication terminals (ACTs) 36 (only one exemplary ACT is shown for each group). The maximum number of ACTs supported by an ACD group determines the maximum number of concurrent calls that can be handled, assuming sufficient agents are available to staff each of the ACTs and enough voice channels are available between the switch and line unit. A computer 38 may be associated with each ACD group and is coupled to the respective supporting switch in order to provide locally entered commands that affect the operation of the ACD system and to receive status data for monitoring the operational parameters of the ACD system, such as call-waiting times and other parameters, available from the switch.

The three types of drawing lines utilized in FIG. 1 identify different types of communication channels among the respective elements. The solid lines represent communication channels which are capable of supporting voice communication paths but may also support data communications. The intermittent dashed lines represent high-speed data communication channels which are utilized to transfer messages, commands, and data among the connected elements. The dashed lines represent relatively lower speed data communication lines which facilitate the transmission of commands, messages, and data among the connected elements. An explanation of utilization of these communication channels is described below with regard to an example of operation.

The switches 22, 24, and 26 are also capable of supporting conventional telephone traffic. For example, switch 26 is illustrated as supporting a local exchange carrier 42 which supports a plurality of conventional telephone customers as represented by CPE 40. Thus, the ACD groups may receive incoming calls either from the long distance switches or from local exchange carriers coupled directly to the supporting switch. The switches 22, 24, and 26 are each coupled to the other in order to facilitate the transfer or rerouting of calls between these switches.

A work station 44 is coupled via the relatively low-speed communication channels to the computers in the respective ACD groups and the supporting switches. The work station permits a network-wide administrator to monitor operating conditions and status of the respective ACD groups. The administrator can enter changes as to the routing of calls in order to effectuate manual intervention. The work station 44 is also connected to an ACD network control point (NCP) 46 via the illustrated communication channel. The ACD NCP 46 may comprise an AT&T NCP such as the Model 2 direct services dialed (DSD) NCP. The network control point 46 functions as a control node and database which stores data concerning the operation of the connected telecommunication network. A detailed explanation of the ACD follows below. The ACD NCP is also connected by the illustrated communication link to another NCP 48 which may also comprise an AT&T 2DSD NCP. The general purpose of the NCPs is to provide a source of data and intelligence for providing flexibility in the control of calls and associated information. The ACD NCP 46 and the NCP 48 are each connected by the illustrated high-speed data communication link to a signal transfer point (STP) 50 which may comprise an AT&T Model 2 Signal Transfer Point. The STP together with other STPs (not illustrated), provide a network of transfer nodes for transferring messages and commands between the corresponding connected elements. An intelligent control point (ICP) 52 which may include a conventional NCP provides a node which applies intelligence by means of control programs that utilize data stored in the connected NCP. The ICP makes decisions and transits messages to implement the decisions based on an operating program such as designed to control the traffic flow in the illustrated network. The ICP may, for example, comprise an AT&T ICP NCP.

Figure 2:
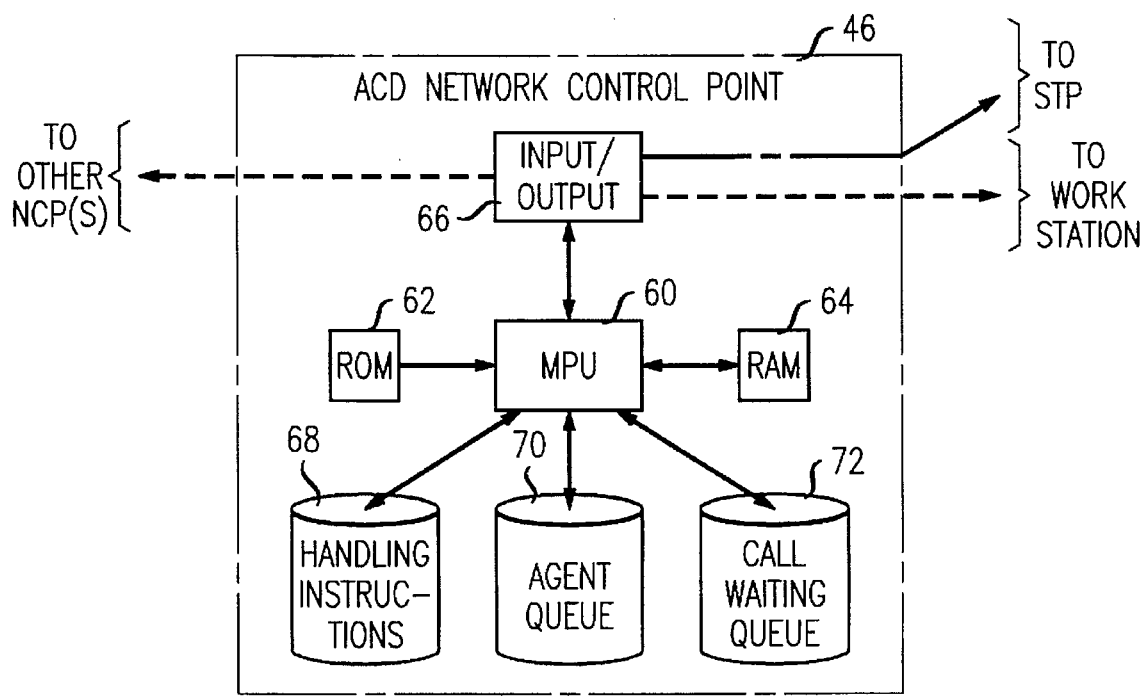
FIG. 2 is a block diagram of an ACD network control point as shown in FIG. 1.

FIG. 2 illustrates an embodiment of an ACD NCP 46 as shown in FIG. 1. The ACD NCP 46 includes a microprocessing unit (MPU) 60 which operates under the control of stored program to accommodate the functions which are described below in accordance with an example of operation. The MPU 60 utilizes program modules stored in read-only memory (ROM) 62 and data storage and retrieval capability associated with random access memory (RAM) 64. The MPU 60 is coupled to input/output module 66 which accommodates communication with the illustrated communication paths. This facilitates the reception of data and commands such as from the work station or from the ICP 52 via STP 50, and supports the transmission of information (messages) based on data associated with ACD NCP 46 to other network elements. In the illustrative embodiment ACD NCP 46 contains three data storage devices, such as consisting of hard disks, which are coupled to MPU 60. Each of the storage devices can be considered as storing data associated with different databases. Storage device 68 stores handling instructions associated with the storing of data, retrieval of data, and decision making processes for handling incoming calls to receive ACD service. Storage device 70 stores data and functionally comprises an agent queue, i.e. stores data concerning the busy state or availability of each ACT utilized in providing the ACD service. Preferably, the agent queue stores availability data which is updated on a dynamic real-time basis concerning the availability of each ACT device in each of the ACD groups. Storage device 72 stores information which functions as a call-waiting queue, i.e. data associated with incoming calls to receive ACD service which cannot be immediately routed to an agent in an appropriate ACD group. The agent queue and call-waiting queue can each be segregated in accordance with the corresponding subscriber to which incoming calls are to be serviced. Alternatively, additional subscriber identifying data can be associated with each entry and call-waiting queue to permit the data to be located based on a particular ACD subscriber, such as associating additional data with the calling party's telephone number. It will be apparent to those skilled in the art that an incoming call to a particular airline must be routed to one of the airline's agents which are a member of one of the ACD groups as opposed to an agent associated with a different company.

Figure 3:
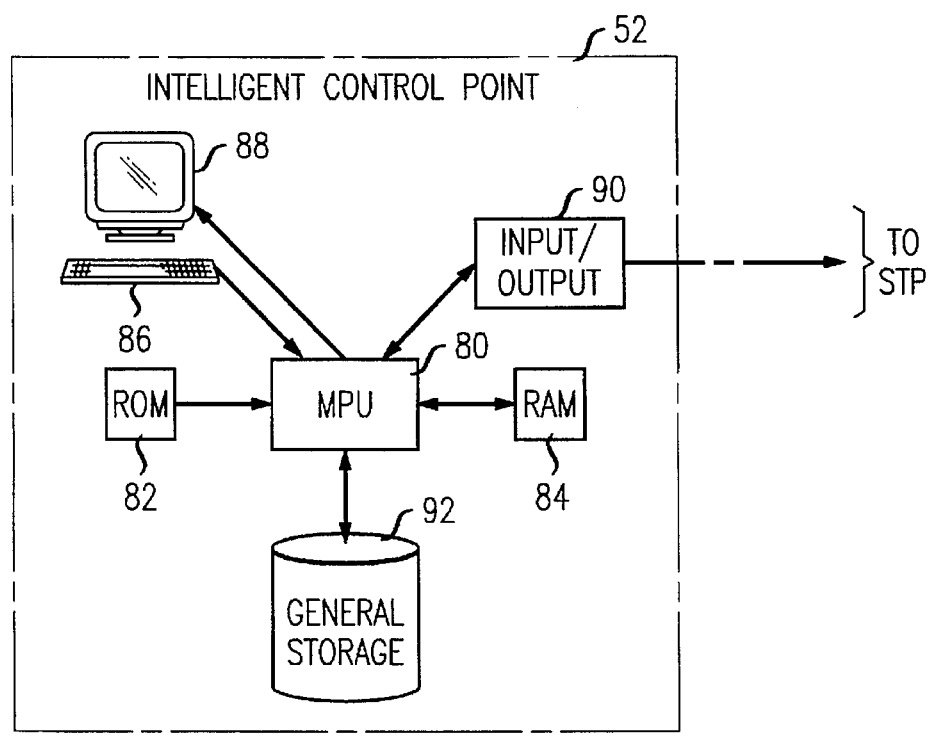
FIG. 3 is a block diagram of an intelligent control point as shown in FIG. 1.

FIG. 3 is a block diagram of an embodiment of an intelligent control point 52 as illustrated in FIG. 1. The ICP provides intelligence or decision making capabilities based upon stored programs and data which is available either in the ICP or as obtained from other data sources such as network control points 48 and ACD NCP 46. The illustrative ICP 52 comprises an MPU 80 which operates under program control as supported by ROM 82, RAM 84, input keyboard 86, output display monitor 88, and input/output interface device 90 which provides communication capability, i.e. transmission and reception, of data and commands to other elements coupled by the STP communication network. MPU 80 is also supported by a non-volatile data storage device 92, such as a hard disk, which provides general storage of program controlled instructions and data which is utilized in decision making carried out by the ICP.

In the illustrative embodiment each ACT is connected by a voice and data path to its line unit. For example, the line units may comprise a remote ISDN line units available from AT&T which supports at least one voice channel and a data channel for each ACT coupled thereto. Availability of the ACT to accept a call may be determined by data which evidences that the ACT is actively manned, i.e. in service, and that the handset of the ACT is on-hook. This status information is made available through the line unit to the supporting switch such as provided by operation of the AT&T Pinnacle ACD/MIS. In the illustrative embodiment two alternative data networks can be utilized to communicate the ACT availability information to the ACD NCP 46. Either the relatively lower speed data network coupled by work station 44 to ACD NCP 46 or the high-speed data network which couples the supporting switches 22, 24, 26 via STP 50 to ACD NCP 46 can be utilized. Preferably, the higher speed data link is utilized in order to provide the most current real-time status of each ACT for utilization by ACD NCP 46. The agent queue 70 in ACD NCP 46 preferably contains data which reflects the availability of each ACT and contains corresponding time data. For example, this database information can permit agents to be selected based upon the agent that has been available for the longest time. Such information can be represented by a time stamp for each available ACT entered in the agent queue. Alternatively, sequentially increasing numbers can be assigned to ACTs as they are entered in the agent queue so that the ACT associated with the smallest number would represent the ACT having been available for the longest time. It will be apparent that each ACT must be associated with a particular group of ACDs and with the ACD subscriber, i.e. company to which the calls are directed. That is, an incoming call will be routed only to an agent associated with the particular subscriber. Thus, it will be apparent that the corresponding records relating to ACT availability must also be identified relative to the subscriber served in order to effectively manage call distribution. Separate subdivisions of the agent queue can be utilized for tracking agents for each application of a subscriber or an agent queue may be maintained by utilizing an additional field in each ACT record to maintain correlation between the ACT and the associated subscriber.

In the illustrative embodiment incoming calls requiring ACD service are routed through the network via the ACD NCP 46 which maintains a call-waiting queue 72. This queue is utilized to maintain a database containing records associated with incoming calls which cannot be immediately routed because of the lack of an appropriate, available ACT to handle the call. Similar to the records maintained for the agent queue, records are maintained in the call-waiting queue 72 which identify the time the call to be held is entered into the call-waiting queue. It will also be apparent that calls handled by the call-waiting queue 72 must have corresponding indicia which permits the particular subscriber to be identified so that corresponding appropriate ACTs can be identified. When an appropriate ACT becomes available, a call associated with a record in the call-waiting queue having the longest waiting time can be identified so that waiting calls are handled on a first-in/first-out basis dependent upon the availability of an appropriate ACT/agent.

It may be desirable to utilize other ways of prioritizing or selecting a call held in the call queue to be routed to an agent. For example, the caller's telephone number can be used to determine if the call originated outside the local country (location of agents). Such international calls can be given priority ahead of other in-country calls in order to minimize call waiting in view of the higher costs of the call. Similarly, it may be sufficiently desirable for a subscriber who pays for incoming calls to accept slightly longer hold times for callers in order to minimize costs. For example, a caller in Los Angeles could be held in a call-waiting queue up to a predetermined time in anticipation of an ACT in a Los Angeles ACD group becoming available. If an ACT in Los Angeles did not become available within the predetermined time, the next available ACT at any location could be assigned to the call. Of course, these types of other ways can be used in combination with a first-in, first-out technique in accordance with the desires of the subscriber.

One of the important aspects of the present invention is the capability of distributing calls based on current ACT availability. In order to minimize call-waiting times, it is desirable to have real-time status information concerning the availability of an ACT to accept an incoming call. As used herein, "real-time" information means information available in less than a few seconds, as opposed to longer delays. Such real-time information concerning agent/ACT availability is preferably stored in agent queue 70. In the illustrative embodiment, an AT&T 5ESS ACT/MIS Pinnacle system may include switch 22 and ACD group 28. In this system, status information concerning ACT 36A is transmitted by line unit 34A to switch 22. Switch 22 contains a program which utilizes the status information in the distribution of incoming calls received by the switch and provides status information to computer 38A which uses this information to maintain a statistical record of performance of the system. The computer is also utilized by an operator to generate command signals to ACD NCP 46 and switch 22 causing the network to alter the handling of incoming calls or the processing of data in accordance with such instructions.

In accordance with the present invention additional program instructions are executed by switch 22 causing changes in the status data associated with each ACT served by the switch to be transmitted, not only to computer 38A but also, to ACD NCP 46 preferably utilizing the high-speed data network via STP 50. The STP may comprise part of the known common channel interoffice signaling (CCIS) network which carries control information and messages between network elements. Thus, switch 22 includes additional program steps causing the generation of a message to be sent over the CCIS network addressed to ACD NCP 46 which contains identification of an ACT, and an indication of the change of status of the ACT. For example, the ACT may have affected a status change by the agent picking up the handset causing the ACT to become busy; alternatively, the agent may have returned the receiver to an on-hook condition, thereby causing the ACT to enter an available status mode ready to receive another incoming call. The ACT status changes are transmitted to the switch which executes the additional program steps in accordance with the present invention to cause this information to be transferred to ACD NCP 46.

In accordance with an example of the operation of the present invention, assume that the following conditions exist. An airline provides an "800" toll-free number for use by its customers and has a first team of agents in New York associated with ACD group 28A and a second team of agents located in Los Angeles associated with ACD group 28C. Because of heavy calling volume, all active ACT positions in both ACD groups are busy handling incoming calls. A customer utilizing telephone 10 now places a call using the toll-free number to the airline.

Table I is a flow listing which describes the steps associated with the handling of the exemplary call in accordance with an embodiment of the present invention. The steps of Table I should be considered in view of FIG. 1 in order to maintain a perspective of the relationship of the steps with the network elements.

Table I (1) A customer causes telephone 10 to come off-hook and enters a call to the 800-AAA-BBBB number of the airline.

(2) Local exchange carrier 12 transmits a call request to long distance switch 16 that included the directory number entered from telephone 10 and the caller's number via automatic number identification (ANI).

(3) Long distance switch 16 generates a route request message which is transmitted by STP 50 to ICP 52. This route request message includes the switch 16 call identification number, the dialed directory number and the caller's ANI.

(4) Upon receipt of the route request message from switch 16, ICP 52 generates a message requesting routing instructions which is transmitted via STP 50 to ACD NCP 46. This message typically includes the ICP call identification number, the call directory number and the caller's ANI.

(5) Upon receipt of the agent request identification from ICP 52, ACD NCP 46 consults its database, identifies the ACD groups and ACTs within the identified groups assigned to handle incoming calls directed to the dialed directory number. Agent queue 70 is queried to determine if an appropriate ACT is available. In the illustrative example the query reveals that all ACTs are busy, i.e. no available ACT appears in the agent queue.

(6) Thus, the ACD NCP 46 generates a reply message to the ICP indicating all agents are busy and that the incoming call should be routed to switch 22 to wait for an available agent. It should be noted that since ACD groups are associated with switch 22 and 26 the call could have routed to switch 26. This message is transmitted from ACD NCP 46 via STP 50 to ICP 52. This message also contains the routing and destination number for switch 22.

(7) The ICP 52 receives the message from ACD NCP 46 and in turn, generates an instruction message which is transmitted via STP 50 to long distance switch 16 to route the call to switch 22. The routing and identification number of the switch is included in this message.

(8) Upon receipt of the above message, long distance switch 16 transmits a message via STP 50 to switch 22 transferring the call to switch 22. The message to switch 22 includes the dialed directory number and the caller's ANI. A voice path is established from switch 16 via switch 18 to switch 22.

(9) Upon receiving the call request, switch 22 generates a message querying ACD NCP 46 to identify an ACT agent to receive the corresponding call; this message is transmitted via STP 50.

(10) Upon receipt of this message from switch 22, ACD NCP 46 identifies a group of agents available to serve the dialed subscriber number, and determines that no ACT is available to handle the incoming call.

(11) The ACD NCP 46 generates and transmits to switch 22 a message directing that the corresponding call be queued, i.e. held, pending availability of an ACT agent. Prior to sending this message, the ACD NCP 46 obtains stored data from database 68 corresponding to the subscriber identified by the dialed number indicating an announcement to be played and a music type to be played pending availability of an ACT. A message including this information is transmitted to switch 22. Additionally, ACD NCP stores corresponding data identifying the corresponding call in call-waiting queue 72.

(12) Upon receipt of this message, switch 22 plays the identified announcement(s) to the caller and follows the playing of the announcement(s) by the playing of an identified music type to the caller.

(13) Switch 22 is continually receiving status information concerning the availability of ACTs in ACD group 28A and calls in queue. Upon receiving data indicating an availability status change of ACT 36A (it has become available to accept an incoming call), switch 22 transmits this status change to ACD NCP 46 to update agent queue 70.

(14) ACD NCP 46 receives the message that an agent (ACT 36A) has become available and updates agent queue 70. When calls are waiting, as indicated by the call-waiting queue 72, the entry of a newly available ACT triggers a query to determine the oldest call which can be served by the available ACT.

(15) Upon locating this call, ACD NCP 46 transmits an instruction message to switch 22 including the identification of the agent and the call to be transferred to the agent.

(16) Upon receipt of this instruction, switch 22 identifies the corresponding call which had been previously placed on "music hold", and completes a path to the identified available ACT.

(17) Upon the agent of the identified ACT answering the incoming call, call completion in accordance with the present invention is concluded.

It will be apparent to those skilled in the art that other conditions can exist in the network which will impact the handling of calls requesting ACD service. For example, if an ACT were initially available to handle an incoming call request, the ACT would be identified by ACD NCP 46 upon the ACD identification request message from the supporting switch 22 resulting in the incoming call not being placed in the call-waiting queue since the call would be immediately handled. The corresponding ACT identification would be sent from ACD NCP 46 to switch 22 enabling the call to be handled.

Another condition can be considered where a plurality of ACT agents are available for a subscriber associated with an incoming call. In these circumstances, the incoming call can be handled immediately and the ACT which has been available for the longest period of time, as indicated by the agent queue in ACD NCP 46, will be identified to handle the corresponding call. This results in an effective utilization of a first-in, first-out handling of both ACTs and waiting calls.

A further feature in accordance with the present invention involves the ability to reroute a call held pending service at one switch, such as switch 22, to another switch, such as switch 26, should an agent first become available at an ACD group supported by the latter switch. In this circumstance the call transaction processing would flow substantially in accordance with the previously explained Table I but would be modified as follows. Upon the agent queue of ACD NCP 46 being updated to indicate the availability of an ACT associated with switch 26 to handle an incoming call, and the determination that the longest waiting call is for a subscriber which could be served by the now available ACT supported by switch 22, the ACD NCP 46 would issue a message to be transmitted to switch 22 which would contain rerouting instructions identifying the destination address of switch 26 as the destination for the rerouting (forwarding) of the corresponding call. Following the transfer of the call to switch 26, the switch 26 would again initiate a request for identification of appropriate agent from ACD NCP 46. In this event ACD NCP 46 would identify the recently made available ACT associated with switch 26 and thereby complete the call processing transaction by connecting the call waiting party to the ACT associated with ACD group 28C as supported by switch 26. In this manner the next available ACT can be provided to the longest waiting call even though the ACT is not associated with the switch which is presently holding the call.

Alternative embodiments of the present invention can also be utilized to achieve the call distribution advantages described above in connection with the embodiment illustrated in FIG. 1. For example, the ACD groups 28A, 28B, 28C, etc. can consist of an ACD function provided by a private branch exchange (PBX) such as an AT&T Definity® communications system. Since such a PBX based ACD system provides substantially self-contained intelligence in terms of call distribution, the supporting switch from which calls are routed may not have access to the availability status information associated with each ACT supported by the PBX. In such an arrangement the PBX based ACD would transmit availability/status information for each ACT to ACD NCP 46 to maintain a real-time current agent queue 70.

In another alternative to the illustrative embodiment, incoming calls to be serviced by the network ACD system can be held at a long distance switch, such as switch 16, as opposed to being routed through the network and being held at an ACD service switch, such as switch 22. For such an embodiment, it will be apparent that the long distance switches must support the playing of announcements and the playing of music or other audible information to a caller waiting to be connected to an agent. It will be apparent that the ACD NCP 46 will direct instructions to the switch 16 to hold the call pending ACT availability and to play announcements/music.

In the illustrative embodiment, the ACD NCP 46 as shown in FIG. 2 included both the agent queue 70 and call-waiting queue 72. This permits a single node to obtain local, rapid access to data utilized to assign agents as they become available to waiting calls. However, it is possible that another database in the network, such as another NCP in the network, could be utilized to contain one of queues 70 and 72. In such an embodiment the decision making node would require access to such data and, hence appropriate data transmission would be required between the decision making node and any other alternate nodes which contain the required data needed for decision making. A high-speed data network such as illustrated in FIG. 1 can be utilized for such data transmission.

Another capability of the present invention resides in the ability to utilize the same call distribution system for local originated calls, i.e. calls via a LEC directly supported by the switch that also serves the group of ACTs to handle the call. In this case the switch will utilize call screening to identify local calls that are bound to a directory number associated with ACD service provided by the same switch. Upon receiving such calls, the switch will seek call handling instructions as explained above from ACD NCP 46 and will handle the call in accordance with the received instructions.

The present invention provides numerous advantages which can be embodied in a network-wide control of automatic call distribution. Dynamic, that is, real time, updates are provided to a central decision making node in order to provide more efficient distribution of calls to each subscriber to the ACD service. Dynamic rerouting of an ACD incoming call from a first switch which supports the ACD group to which the call is normally routed to a second switch which supports a second ACD group for service by an agent associated with the second switch; this assumes that both the first and second ACD groups contain agents which support the same ACD subscriber, i.e. normally the same company.

Efficiency in call distribution is further enhanced by call assignment to the subscriber's agent having been idle for the longest time on a network-wide basis. Call handling efficiencies can also be enhanced by the utilization of a first-in/first-out agent queue which serves the network-wide ACD system. By using an integrated network-wide ACD control mechanism which services a large geographic area such as the entire continental United States, small groups of agents can be utilized throughout the United States to provide flexibility to ACD subscribers in adding and managing the need for agents on a dynamic basis.

Although an embodiment of the present invention is illustrated in the drawings and described above, the scope of the invention is defined by the claims which follow.

The invention claimed is:

1. An automatic call distribution (ACD) network that supports the distribution of incoming calls to a plurality of agent communication terminals (ACTs) coupled to the network, whereby agents using associated ACTs answer incoming calls for which ACD service is provided, the ACD network comprising:

a first telecommunication switch that receives and holds one of said incoming calls;

a plurality of second destination telecommunication switches coupled between said first switch and ACTs for connecting said incoming calls to said ACTs;

an integrated control system coupled to said first and second switches for controlling the distribution of incoming calls among individual ACTs, the system including:

agent queue means for storing agent availability (AA) data indicative of the availability of each individual ACT to accept an incoming call;

call queue means for storing call waiting data for each incoming call that cannot be initially serviced; and control node means coupled to said agent queue means and call queue means for selecting a specific ACT to accept said one call based on said AA data and call waiting data, said control node means sending routing instructions to the first switch at which the one call is held awaiting said routing instructions, said routing instructions causing said first switch to route the one call to one of said second switches that supports the selected ACT, said control node means also sending routing instructions that identify said selected ACT to the one of the second switches, whereby calls awaiting ACD service are handled on a network wide basis.

2. The network according claim 1 wherein said agent queue means comprises a data storage queue that stores availability data for each ACT coupled to said network so that incoming calls for each ACD subscriber will be handled based on the availability of all agents that support said subscriber.

3. The network according claim 2 wherein said agent queue means comprises a single data storage queue that collects and stores availability data for each ACT coupled to said network.

4. The network according claim 1 wherein said control node means routes incoming calls awaiting ACD service to an available specific ACT on a first in, first out basis so that a call having the longest waiting time is selected to be routed to the next available ACT that can service the call in order to minimize time spent awaiting service.

5. The network according claim 4 wherein said control node means selects one specific ACT from among a plurality of availability ACTs based on said AA data, said control node means selecting said one specific ACT that has been available for the longest time to implement such selecting on a first in, first out basis to equalize the distribution of call to ACTs.

6. The network according claim 1 wherein said control node means selects one specific ACT from among a plurality of availability ACTs based on said AA data, said control node means selecting said one specific ACT that has been available for the longest time to implement such selecting on a first in, first out basis to equalize the distribution of call to ACTs.

7. The network according claim 1 wherein a certain subscriber has first and second groups of ACTs that are associated with first and second subject matter areas, respectively, said control node means comprising means for rerouting a call initially routed to said first group so that said rerouted call is handled as if it had been directed to said second group when said second group of ACTs has a specific ACT that becomes available prior to the availability of an ACT in said first group.

8. The network according claim 1 wherein said control node means further comprises means for sending instructions to a long distance switch, from which a call request for an ACT entered said system, to hold the call associated with said call request pending the availability of an ACT.

9. The network according claim 1 wherein said control node means further comprises means for sending instructions to one of the telecommunication switches associated with the specific ACT to receive an incoming call to hold a corresponding call pending availability of an ACT.

10. The network according claim 1 further comprising means coupled to said control node means for storing subscriber handling instructions, said consol node means selecting one ACT from among a plurality of available ACTs based on said AA data and subscriber handling instructions.

11. The network according claim 10 further comprising means coupled to said control node means for storing subscriber handling instructions, said control node means selecting one incoming call from among a plurality of calls awaiting ACD service based on said call waiting data and subscriber handling instructions.

12. The network according claim 1 further comprising means coupled to said control node means for storing subscriber handling instructions, said control node means selecting one incoming call from among a plurality of calls awaiting ACD service based on said call waiting data and subscriber handling instructions.

13. An automatic call distribution (ACD) control network that supports the distribution of incoming calls to a plurality of agent communication terminals (ACTs) coupled to the network, whereby agents using associated ACTs answer incoming calls for which ACD service is provided, the network comprising:

agent queue means for storing agent availability (AA) data indicative of the availability of each individual ACT to accept an incoming call;

call queue means for storing call waiting data for each incoming call that cannot be initially serviced; and control node means coupled to said agent queue means and call queue means for selecting a specific ACT to accept a call awaiting ACD service based on said AA data and call waiting data, said control node means sending routing instructions to a first switch at which one of the incoming calls is held awaiting said routing instructions, said routing instructions causing said first switch to route the one call to a destination switch that supports the selected ACT, said control node means also sending routing instructions that identify said selected ACT to the one of the second switches, whereby calls awaiting ACD service are handled on a network wide basis.

14. The network according claim 13 wherein said agent queue means comprises a data storage queue that stores real time availability data for each ACT couple to said network so that incoming calls for each ACD subscriber will be handled based on the availability of all agents that support said subscriber.

15. The network according claim 14 wherein said agent queue means comprises a single data storage queue that collects and stores availability data for each individual ACT coupled to said network.

16. The network according claim 13 wherein said control node means routes incoming calls awaiting ACD service to a specific available ACT on a first in, first out basis so that a call having the longest waiting time is selected to be routed to the next available ACT that can service the call in order to minimize time spent awaiting service.

17. The network according claim 16 wherein said control node means selects one specific ACT from among a plurality of availability ACTs based on said AA data, said control node means selecting said one specific ACT that has been available for the longest time to implement such selecting on a first in, first out basis to equalize the distribution of call to ACTs.

18. The network according claim 13 wherein said control node means selects one specific ACT from among a plurality of availability ACTs based on said AA data, said control node means selecting said one specific ACT that has been available for the longest time to implement such selecting on a first in, first out basis to equalize the distribution of call to ACTs.

19. The network according claim 13 wherein a certain subscriber has first and second groups of ACTs that are associated with first and second subject matter areas, respectively, said control node means comprising means for rerouting a call initially routed to said first group so that said rerouted call is handled as if it had been directed to said second group when said second group of ACTs has a specific ACT that becomes available prior to the availability of an ACT in said first group.

20. The network according claim 13 wherein said control node means further comprises means for sending instructions to a long distance switch, from which a call request for an ACT entered said network, to hold the call associated with said call request pending the availability of a specific ACT.

21. The network according claim 13 wherein said control node means further comprises means for sending instructions to one of the telecommunication switches associated with the specific ACT to receive an incoming call to hold a corresponding call pending availability of the specific ACT.

22. The network according claim 13 further comprising means coupled to said control node means for storing subscriber handling instructions, said control node means selecting one specific ACT from among a plurality of available ACTs based on said AA data and subscriber handling instructions.

23. The network according claim 22 further comprising means coupled to said control node means for storing subscriber handling instructions, said control node means selecting one incoming call from among a plurality of calls awaiting ACD service based on said call waiting data and subscriber handling instructions.

24. The network according claim 13 further comprising means coupled to said control node means for storing subscriber handling instructions, said control node means selecting one incoming call from among a plurality of calls awaiting ACD service based on said call waiting data and subscriber handling instructions.

25. A method for providing network-wide automatic call distribution (ACD) in a network that supports the distribution of incoming calls to a plurality of agent communication terminals (ACTs) coupled to the network, whereby agents using associated ACTs answer incoming calls for which ACD service is provided, the method comprising the steps of:

storing agent availability (AA) data indicative of the availability of each individual ACT to accept an incoming call in an agent queue;

storing call waiting data in a call queue for each incoming call that cannot be initially serviced due to the unavailability of an appropriate ACT to accept the call as determined by said AA data;

selecting a specific ACT to accept a call awaiting ACD service based on said AA data and call waiting data; and sending routing instructions to a first switch at which one of the incoming calls is held awaiting said routing instructions, said routing instructions causing said first switch to route the one call to a destination switch that supports the selected ACT, said control node means also sending routing instructions that identify said selected ACT to the one of the second switches, whereby calls awaiting ACD service are handled on a network wide basis.

26. The method according claim 25 wherein said step of storing AA data comprises the step of storing real time availability data for each ACT coupled to said network so that incoming calls for each ACD subscriber will be handled based on the availability of all agents that support said subscriber.

27. The method according claim 26 wherein said step of storing AA data comprises the step of storing availability data for each ACT in a single data storage queue that collects and stores availability data for each ACT coupled to said network.

28. The method according claim 25 further comprising the step of routing incoming calls awaiting ACD service to an available ACT on a first in, first out basis so that a call having the longest waiting time is selected to be routed to the next available ACT that can service the call in order to minimize time spent awaiting service.

29. The method according claim 28 further comprising the step of selecting one specific ACT from among a plurality of availability ACTs based on said AA data, said one specific ACT selected being the one with the longest availability time to implement such selecting on a first in, first out basis to equalize the distribution of call to ACTs.

30. The method according claim 25 further comprising the step of selecting one specific ACT from among a plurality of availability ACTs based on said AA data, said one specific ACT selected being the one with the longest availability time to implement such selecting on a first in, first out basis to equalize the distribution of call to ACTs.

31. The method according claim 25 wherein a certain subscriber has first and second groups of ACTs that are associated with first and second subject matter areas, respectively, the method further comprising the step of the rerouted call being handled as if it had been directed to said second group when said second group of ACTs has a specific ACT that becomes available prior to the availability of an ACT in said first group.

32. The method according claim 25 further comprising the step of sending instructions to a long distance switch, from which a call request for an ACT entered said network, to hold the call associated with said call request pending the availability of a specific ACT.

33. The method according claim 25 further comprising the step of sending instructions to one of the telecommunication switches associated with an ACT to receive an incoming call to hold a corresponding call pending availability of an ACT.

34. The method according claim 25 further comprising the step of storing subscriber handling instructions, said selecting step selecting one specific ACT from among a plurality of availability ACTs based on said AA data and subscriber handling instructions.

35. The method according claim 34 further comprising the step of storing subscriber handling instructions, said selecting step selecting one incoming call from among a plurality of calls awaiting ACD service based on said call waiting data and subscriber handling instructions.

36. The method according claim 25 further comprising the step of storing subscriber handling instructions, said selecting step selecting one incoming call from among a plurality of calls awaiting ACD service based on said call waiting data and subscriber handling instructions.

37. A method for providing automatic call distribution (ACD) for incoming calls to a plurality of agent communication terminals (ACTs) connected to a first network, another network carries the incoming calls to the first network, the method comprising the steps of:

receiving one of the incoming calls at a first switch in the another network, the ACTs from which service is sought by said one call is supported by a second switch in the first network;

holding said one call at the first switch and not routing the call to said second switch until routing instructions for the one call are received at the first switch;

determining if one of the ACTs is available to receive the one call based on ACT availability; and sending said routing instructions to the first switch only after the availability of the one ACT is determined, whereby incoming calls are routed through the another network only after an ACT availability determination has been made.

38. The method according to claim 37 wherein said sending step further comprises the step of sending said routing instructions to the first switch only after a specific one of the ACTs is determined to be available to handle the one call.

39. The method according to claim 37 wherein said determining step is implemented by the another network based on ACT availability data received and stored by the another network.

40. An automatic call distribution (ACD) control apparatus that controls the routing of incoming calls to a plurality of agent communication terminals (ACTs) supported by a first network, another network carries the incoming calls to the first network, the control apparatus comprising:

first means coupled to the another network for receiving and storing agent availability data indicative of the availability of each ACT to accept the incoming calls;

second means, coupled to the another network and first means, for receiving a call request associated with one of the incoming calls;

means, coupled to said first and second means, for determining if one of the ACTs is available to receive the one incoming call based on ACT availability; and means coupled to said determining means for sending routing instructions to a first switch in the another network which received said call request, said sending means sending the routing instructions when said determining means has determined the one ACT to handle the one call so that the one incoming call is not routed through the another network until an available ACT has been determined.

41. The control apparatus according to claim 40 wherein said sending means sends said routing instructions to the first switch only after a specific one of the ACTs is determined to be available to handle the one call.

* * * * *